US012044380B2

(12) United States Patent
Val et al.

(10) Patent No.: US 12,044,380 B2
(45) Date of Patent: Jul. 23, 2024

(54) LIGHT MODULE FOR A MOTOR VEHICLE

(71) Applicant: VALEO VISION, Bobigny (FR)

(72) Inventors: Alexandre Val, Bobigny (FR); Zdravko Zojceski, Bobigny (FR); Antoine De Lamberterie, Bobigny (FR); Samuel Daroussin, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/247,039

(22) PCT Filed: Sep. 30, 2021

(86) PCT No.: PCT/EP2021/077022
§ 371 (c)(1),
(2) Date: Mar. 28, 2023

(87) PCT Pub. No.: WO2022/069672
PCT Pub. Date: Apr. 7, 2022

(65) Prior Publication Data

US 2023/0366523 A1 Nov. 16, 2023

(30) Foreign Application Priority Data

Sep. 30, 2020 (FR) ..................................... 20 10014

(51) Int. Cl.
*F21S 43/14* (2018.01)
*F21S 43/15* (2018.01)
*F21S 45/40* (2018.01)

(52) U.S. Cl.
CPC ............... *F21S 43/14* (2018.01); *F21S 43/15* (2018.01); *F21S 45/40* (2018.01)

(58) Field of Classification Search
CPC ............. F21S 43/14; F21S 43/15; F21S 45/40
See application file for complete search history.

(56) References Cited

U.S. PATENT DOCUMENTS

| | | | | |
|---|---|---|---|---|
| 6,299,337 | B1 | 10/2001 | Bachl et al. | |
| 9,896,023 | B1 * | 2/2018 | Salter | F21S 43/255 |
| 11,168,862 | B2 * | 11/2021 | Crompvoets | F21S 43/15 |
| 2005/0259434 | A1 * | 11/2005 | Pederson | G02B 19/0071 362/555 |

(Continued)

FOREIGN PATENT DOCUMENTS

| | | | |
|---|---|---|---|
| EP | 1 033 525 A2 | 9/2000 | |
| WO | WO 2015/190431 A1 | 12/2015 | |

OTHER PUBLICATIONS

International Search Report issued Dec. 21, 2021 in PCT/EP2021/077022, filed on Sep. 30, 2021, 2 pages.

*Primary Examiner* — Bryon T Gyllstrom
(74) *Attorney, Agent, or Firm* — Oblon, McClelland, Maier & Neustadt, L.L.P.

(57) ABSTRACT

A motor vehicle signaling device light module includes a substrate on which a matrix arrangement of elementary light sources is mounted, a connector fixed to the substrate having a rectangular footprint with a long side and a narrow side, and a support designed to hold the substrate in position in the signaling device. The substrate is curved around an axis of curvature, and the light sources are arranged to produce a convex display from the point of view of a user outside of the vehicle, so that the long side of the connector is substantially parallel to the axis of curvature.

20 Claims, 6 Drawing Sheets

(56) References Cited

U.S. PATENT DOCUMENTS

Figure 1:
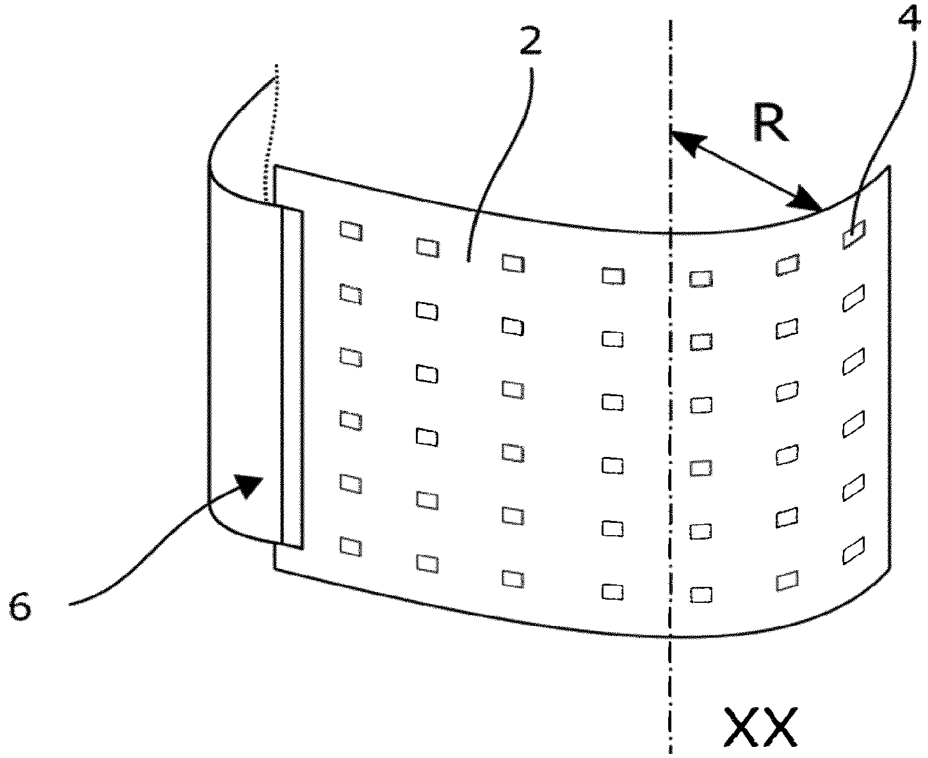

| | | | | |
|---|---|---|---|---|
| 2014/0140082 | A1* | 5/2014 | Kuboyama | F21V 9/00<br>362/510 |
| 2015/0003083 | A1* | 1/2015 | Uehara | F21S 43/14<br>362/418 |
| 2017/0241611 | A1* | 8/2017 | Pan | F21K 9/90 |
| 2018/0066819 | A1 | 3/2018 | Chen et al. | |
| 2023/0349526 | A1* | 11/2023 | Park | H01L 33/62 |

* cited by examiner

AA

BB

LIGHT MODULE FOR A MOTOR VEHICLE

The invention relates to the field of lighting and of light-signaling for motor vehicles. More specifically, the invention relates to the field of screens integrated into motor vehicle lighting or light-signaling lighting modules.

It is known practice to integrate screens into motor vehicle lighting modules, for example into tail lights. These screens are for example made up of arrays of a large number of selectively activatable light sources, the dimensions of which are small enough for it to be possible to display, on these screens, information, for example in the form of messages or pictograms, with a satisfactory resolution. Such information thus makes it possible to improve the signaling given by the motor vehicle, for example by contextualizing a given signaling function or displaying an accompanying message. For comfort and safety reasons, it is however necessary to integrate the screen into the lighting module in such a way that the visible appearance of the screen is uniform, for reasons of comfort, and in such a way that the screen and the information displayed thereon are visible in a wide field of view.

Furthermore, motor-vehicle esthetics impose certain constraints on the integration of the screen. Specifically, in order to fit in with the modern look of motor vehicles, motor vehicle tail lights and headlamps nowadays have an outer lens that is highly curved, and this has a strong impact on the shape of the internal components.

In order to meet these various constraints, there has been the idea of curving the screen to give it a convex shape, so as to mimic the curvature of the outer lens and to obtain a surface that is visible in a wide field of view, and with an appearance that is uniform. However, known screen technologies, for example LCD screen technologies, because of the substrates used for mounting and operating their light sources, are unable to meet this need for curvature. In particular, these technologies are not suitable for small radii of curvature, because then the protection of the various intermediate layers of these substrates, which is normally afforded by the outer layers, is no longer optimal. Conversely, OLED-type screen technologies do make it possible to obtain curved screens, but do not offer the durability required for the automotive field. Thus, the screens may suffer from corrosion effects as a result of the internal environment of the tail light or of the headlamp, for example as a result of moisture, temperature, sulfur or chlorine derivatives, which may infiltrate into the interfaces between these intermediate layers.

Finally, it is desirable to integrate this screen into a lighting module while giving it a floating appearance, which is to say an appearance whereby the edges, said to be floating, have no means of electrical connection and/or of mechanical retention that is visible and/or that extends beyond the surface of the substrate. Nevertheless, it is necessary to provide means allowing each of the light sources of this screen to be selectively controlled.

There is thus a need for a motor-vehicle lighting module incorporating a screen of convex shape and that has a floating appearance. The invention falls within this context, and aims to meet this need.

To these ends, one subject of the invention is a lighting module for a motor-vehicle signaling device, comprising:

a substrate comprising an electronic circuit, a matrix array of elementary light sources arranged uniformly with a spacing interval of less than 1 mm, the light sources being mounted on the electronic circuit of the substrate, a connector able to receive an instruction for controlling said elementary light sources, a part of said connector being fixed to the substrate, that part of said connector that is fixed to the substrate having a footprint of rectangular overall shape with a long side and a narrow side, a support designed to hold the substrate in position in the signaling device, characterized in that said substrate is curved about an axis of curvature, so that the light sources are positioned so as to create a convex display from the viewpoint of an observer external to the vehicle, and so that the long side of the connector is substantially parallel to the axis of curvature.

What is meant by the footprint of the part of the connector that is fixed to the substrate is an area occupied on the substrate by the connector and on which components, particularly light sources, cannot be mounted. What is meant by a rectangular overall shape of the footprint is any shape that has a long dimension and a narrow dimension, that can be encompassed within a rectangle in which components, for example light sources, cannot be mounted because of the bulk of the connector. What is meant by a narrow dimension and a long dimension is that the narrow dimension has a length shorter than that of the long dimension. It will be appreciated that, for a rectangular overall shape, a long dimension is the longest side of the rectangle, and a narrow dimension is the shortest side of the rectangle. For example, on a typical connector, the long dimension may be as much as several centimeters, and the narrow dimension is between 3 and 8 mm.

As a preference, the substrate has an exterior face facing toward the exterior of the vehicle and an interior face facing toward the interior of the vehicle. It will be appreciated that the elementary light sources are arranged on the exterior face of the substrate in such a way as to be visible from a customary viewpoint of an observer external to the vehicle.

What is meant by "customary viewpoint" is a viewpoint situated outside the vehicle when the vehicle is in use, and situated at a height above ground level that is at least equivalent to that of the signaling device.

A radius of curvature of the substrate is typically greater than 50 mm, and preferably between 90 and 500 mm. The one same substrate may have several radii of curvature about parallel axes, or a radius of curvature that evolves about parallel axes. In that case, the axis of curvature should be understood as meaning an axis to which the axes of curvature of part of the substrate are parallel. A substrate may have a plurality of curved zones with different axes of curvature.

When the footprint of that part of the connector that is fixed to the substrate is parallel to an axis of curvature of the substrate, stresses experienced by said substrate as a result of the curvature are minimized, making it possible to improve the reliability of the device.

In a frame of reference connected with the signaling device, the axis of curvature may be vertical, or horizontal, or oriented in such a way as to suit esthetic or mechanical integration constraints.

As a preference, the connector comprises an adhesive anisotropic conductive film, the connector being mechanically and electrically connected to the electronic circuit of the substrate by means of said adhesive anisotropic conductive film. The connector is thus an ACF (anisotropic conductive film) connector.

Advantageously, the substrate is made of ceramic. What is meant by a ceramic substrate is a substrate made of a material of crystalline or partially crystalline or amorphous structure, such as a glass or an alumina, the body of which is made up of essentially inorganic substances, and which is formed by a molten mass that solidifies as it cools, or which is formed and brought to maturity, at the same time or subsequently, through the action of heat and/or pressure. Advantageously, the ceramic substrate is an alumina ($Al_2O_3$) substrate or else an aluminum nitride (AlN) substrate. As a preference, the ceramic substrate is a glass substrate (for example based on borosilicate glass); such a substrate has good dielectric properties and a low production cost.

Advantageously, a support holds the substrate in position in a casing of the device.

Advantageously, the support is configured to hold the substrate in a convex shape. In that way, the substrate may be a flexible substrate and its shape is kept rigid by the support.

Advantageously, the substrate comprises an interior face facing toward the interior of the vehicle, said interior face of the substrate being held against the support. In that way, that part of the support that is in contact with the substrate is concealed behind the substrate. In addition, the greater the area of contact between the support and the substrate, the better it is able to absorb the mechanical stresses applied to the substrate. Thus, mechanical stresses on the substrate are reduced, thereby making it possible to use substrates of the type having low mechanical strength, such as a substrate made in a fine thickness of ceramic.

In one particular embodiment, the support holds only a peripheral part of the substrate, preferably a part lying in the 30%, preferably the 20%, closest to the edges of the interior face of the substrate. In that case, and as a preference, the substrate comprises several edges and is held by one of said edges in a section transverse to the substrate and to the axis of curvature, the other edges being at least partially left floating, or even entirely left floating. In that way, the module has a floating appearance.

If desired, the substrate is in contact with the support only over a zone near the edge of the substrate, hidden from any customary viewpoint of an observer external to the vehicle. In that case, the module appears as being particularly fine. It will therefore be appreciated that the curvature imparted to the edge of the substrate means that the entire substrate can be curved. In addition, said curvature contributes to providing rigidity to that part of the substrate that has been left floating.

In that case, and advantageously, the support holds the substrate via an upper edge. In that way, the edge not left free is more easily concealed from any customary viewpoint of an observer external to the vehicle. Thus, the observer perceives the module as being floating, which corresponds to the objectives of the invention.

If desired, the substrate is in contact with the support only over a zone that is concealed from any customary viewpoint of an observer external to the vehicle, except over a part which constitutes a thin border (which is to say a border with a thickness of less than 1 mm) designed to conceal and protect the edges of the substrate. Thus, the module maintains a fine and robust appearance, and the edges of the substrate are protected and decorated by the border. Said border may also comprise a part bent over onto the substrate so that it contributes to positioning and/or holding the substrate on the support.

Advantageously, the support comprises a heat sink member in contact with the substrate. As a preference, said heat sink member is in partial contact with the interior face of the substrate. The heat sink member is preferentially made from a material having a high transmission coefficient, such as a metal like aluminum, copper, or a plastic containing metal particles or a composite material offering properties that are optimized in terms of thermal conductivity, thermal expansion and mass, and notably mechanical ability to withstand shocks and vibrations. In that way, the weight the mass of such a heat sink member in contact with the substrate is borne not by the substrate but by the support that holds the substrate. Thus, mechanical stresses on the substrate are reduced, thereby making it possible to mount a heat sink member on substrates of the type having low mechanical strength, such as a substrate made in a fine thickness of ceramic.

Advantageously, the support is designed to be concealed from any customary viewpoint of an observer external to the vehicle. In that way, a floating display can easily be obtained.

Advantageously, the connector makes the connection between a control device and the substrate by means of a flexible printed circuit board. This type of connector is able to pass the quantity of data necessary for controlling a large number of light sources.

Advantageously, the connector is able to receive an instruction for the control of the light sources and a control unit is designed to selectively control each of the light sources on the basis of said control instruction received by the connector. For example, the light sources are arranged on the substrate in a matrix array and the control unit is designed to address and control each of the light sources according to its position within said matrix. For example, on receipt of a control instruction, the control unit may be configured to scan the matrix vertically, successively selecting each row of the matrix, in particular by applying a selection voltage to each of the rows in succession, and, for each row selected during the scan, to simultaneously apply, on the basis of the control instruction, an activation or deactivation signal to each column of the matrix so as to cause or to prevent the emission of light by the light source addressed by the selected row and this column. The number of tracks that are needed in order to address each of the light sources is thus equal to the sum of the columns and rows.

Advantageously, the connector may comprise a flexible printed circuit board, the control unit being mounted directly on said flexible printed circuit board. This type of arrangement is also known as CoF, or chip on flex. This type of arrangement makes it possible to free up space on the faces of the substrate so that the matrix array of light sources can cover the largest possible proportion of the upper face of the substrate.

As a variant, the control unit may be mounted on the interior face and/or the exterior face of the substrate, notably by means of an adhesive anisotropic conductive film or, as a variant, by being incorporated into a ball grid array, also known as a BGA. This makes it possible for example to reduce the constraints on the arrangement of the connector. In addition, it makes it possible to increase a transmitted power, so that a brightness of the sources is improved. When the substrate is made of glass or another ceramic, this type of arrangement is also known as chip on glass, or CoG.

If desired, a plurality of control units and/or a plurality of connectors may be provided.

Advantageously, when the control unit is mounted mechanically and electrically on the flexible printed circuit board (CoF), the control unit is additionally held on the interior face of the substrate, or on the exterior face of the substrate, or, for preference, on the support. For example, the control unit is held bonded to a part of the substrate that does not have components. In another example, the flexible printed circuit board of the connector has two faces. The control unit is mounted on one face of the flexible printed circuit board, and a part of the face of the flexible printed circuit board on which part the control unit is not mounted is held bonded to the support. In that way, when the module and/or the signaling device is subjected to vibrations, shaking of the control unit that could lead to problems with the reliability of the control unit and/or of the connector is avoided. When the substrate is flexible and the control unit is mounted mechanically and electrically on the flexible printed circuit board (CoF), it is particularly advantageous for the control unit to be held on the support rather than on the substrate; this then avoids the control unit taking up space on the surface of the substrate. In addition, when the support is designed to be concealed from any customary viewpoint of an observer external to the vehicle, the control unit is then also concealed, making it possible to ensure the esthetics of the module.

In one embodiment of the invention, the connector is positioned on a face of the substrate that bears light sources. As a preference, the connector is positioned on a zone of the substrate that is concealed from any customary viewpoint of an observer external to the vehicle. For example, the connector is placed on a part of the module that is concealed behind other elements of the signaling device or of the vehicle from any customary viewpoint of an observer external to the vehicle. Alternatively, a zone of a transparent wall of the signaling device has zones that are opacified to make it possible to conceal the connector at least from any customary viewpoint of an external observer.

Advantageously, the arrangement of elementary light sources covers more than 90% of an outwardly facing face of the substrate. What that means is that the elementary light sources are uniformly arranged on a display part of that face of the substrate that faces toward the exterior, said display part having a surface area representing more than 90% of the total surface area of said face. That then improves the impression that an external observer has that the module is floating.

In one particular embodiment, the substrate has an exterior face facing toward the exterior of the vehicle, the connector being positioned on a zone of the exterior face of the substrate that is concealed from any customary viewpoint of an observer external to the vehicle. Likewise, other, non-lighting components, such as for example a control unit, may be situated on said zone, particularly when their dimensions do not allow them to be integrated in the spacings between the light sources in the arrangement of light sources. For example, the connector may be concealed by elements of the signaling device, such as an opacified zone of a transparent wall or parts of a casing of the signaling device or of other signaling modules, or of elements of the vehicle. If desired, all of the components may then be placed on the substrate may be placed on the one same face. In that case, a more economical substrate can be employed for creating the lighting module.

In another particular embodiment, the substrate has passing through it holes making it possible to establish an electrical connection and the connector is located on a face of the substrate that does not have elementary light sources. It will be appreciated that this allows the connector to be hidden on a face of the substrate that need not be exposed, for example an interior face; that then improves an esthetic appearance of the module.

Advantageously, the substrate has floating edges with no means of electrical connection and/or of mechanical retention that is visible from any customary viewpoint of an observer external to the vehicle or that extends beyond the substrate, and just one edge comprising mechanical-retention or connecting means, notably means extending beyond the surface of the substrate. That is rendered possible from the teaching of one or more of the features of the invention, notably included among the following:

- when non-lighting components, particularly the connector, are situated close to the non-floating edge;
- when the substrate has holes making it possible to establish an electrical connection and the connector is located on a face of the substrate that does not have elementary light sources,
- when a control unit is mounted on a printed circuit board that forms part of the connector.

The lighting module as claimed in one of the preceding claims, characterized in that the substrate has only floating edges with no means of electrical connection and/or of mechanical retention that is visible from any customary viewpoint of an observer external to the vehicle or that extends beyond the substrate, and just one edge comprising mechanical-retention or connecting means, notably means extending beyond the surface of the substrate.

Advantageously, each of the light sources comprises at least one light-emitting semiconductor chip with dimensions comprised between 80 μm and 300 μm. Such a chip is in particular known as a mini-LED. In a variant, each of the light sources comprises at least one light-emitting semiconductor chip with dimensions comprised between 5 μm and 80 μm. Such a chip is in particular known as a micro-LED. If so, the light sources may be mounted, directly or indirectly, on the exterior face of the ceramic substrate, notably such that two adjacent light sources are distant by a maximum of 1 mm.

In one embodiment of the invention, the lighting module comprises a plurality of active control elements, each active control element being designed to control one of the light sources with which it is associated and being placed on the exterior face and mounted on the electronic circuit of the substrate, at one of the through-holes, so as to be connected to a control unit or to a connector mounted on the electronic circuit of the substrate and placed on the interior face of the substrate, said plurality of active control elements forming an active matrix and the control unit being designed to control said active matrix on the basis of said control instruction received by the connector.

In other words, the control unit is able to control each light source by addressing and controlling the associated control element. What is notably meant by an active control element is the fact that each control element is designed to actively maintain the associated light source in the illuminated or switched-off state while the active matrix is being scanned by the control unit.

Advantageously, each light source is mounted on and connected to the control element with which it is associated. For example, each control element comprises a thin film transistor, also known as a TFT, on which the associated light source is mounted and to which same is connected. If so, all of the plurality of light sources and of the plurality of active control elements form an active matrix.

In a variant, the electronic circuit of the substrate may comprise one or more connection thin layers, notably of a thickness less than 50 μm, incorporating a plurality of active control elements, each active control element being designed to control one of the light sources with which it is associated, and each light source is mounted on and connected directly to the electronic circuit of the substrate, substantially in line with a control element of the connection thin layer or layers, to which it is connected. Each active control element may for example be of the integrated microcircuit type, comprising at least one transistor and one memory. If so, all of the plurality of light sources and the connection thin sublayer or sublayers incorporating the plurality of active control elements form an active matrix.

As a further variant, the lighting module comprises a plurality of active control elements, each active control element being designed to control one or a plurality of the light sources with which it is associated and being mounted directly on the electronic circuit of the substrate on the exterior face of the substrate, and each light source is mounted on and connected directly to the electronic circuit of the substrate on the exterior face of the substrate, while being connected to the associated active control element. Advantageously, the electronic circuit of the substrate may comprise one or more sublayers. Each active control element may for example be of the integrated microcircuit type, comprising at least one transistor and one memory. If so, all of the plurality of light sources and of the plurality of active control elements form an active matrix.

In another embodiment of the invention, each light source is mounted directly on the electronic circuit of the substrate, the plurality of light sources forming a passive matrix and the control unit being designed to control said passive matrix on the basis of the control instruction received by the connector. If so, the lighting module may comprise a plurality of devices controlling the supply of electrical power to the light sources, the devices controlling the supply of electrical power being placed on an interior face of the substrate and mounted on the electronic circuit of the substrate. For example, each control device may be placed on the interior face of the ceramic substrate at a through-hole, said control device being designed to control the supply of electrical power to the light source mounted at said through-hole.

Advantageously, the lighting module comprises an opaque coating applied to the exterior face of the substrate. For example, the opaque coating may be formed on an exterior face of the substrate and be provided with openings formed at the location of the light sources. If so, the opaque coating may be applied before the components are mounted on the exterior face of the ceramic substrate, notably by using a mask. As a variant, the opaque coating may be applied after said components have been mounted. As a preference, the opaque coating may be a dark color with a matt appearance. This coating notably makes it possible to avoid the reflection, referred to as parasitic reflection, of rays of light, which would otherwise be emitted by the light sources toward the substrate and thus improves the contrast—something which is desirable when the ambient lighting is very bright.

Advantageously, the interior face of the substrate is in thermal contact with a heat sink member made from a thermally conducting material, notably from aluminum alloy or from copper. Such a member may have fins or pins for dissipating the heat. The heat sink member may also comprise a thermal interface allowing heat to be transmitted between the interior face of the substrate and the heat sink member. As a preference, such an interface is formed from a material that has particular thermal conductivity properties, notably a thermal conductivity coefficient in excess of 1 W/m/° C., able to fill the clearances and spaces between the interior face of the substrate and the heat sink member. In one embodiment, this thermal interface is produced using an adhesive, thus holding the heat sink member in place. In that way, it is possible for the lighting module to be held in place fully via its wall. In another example, a support member held by the signaling device or directly by the vehicle provides the retention of the heat sink member. This support member may also support electrical interfaces of the lighting module, such as a flexible printed circuit board and/or a control unit.

A further subject of the invention is a motor vehicle light-signaling device comprising a light module according to the invention. If desired, the signaling device may be arranged in a tail light of the motor vehicle.

Figure 2A:
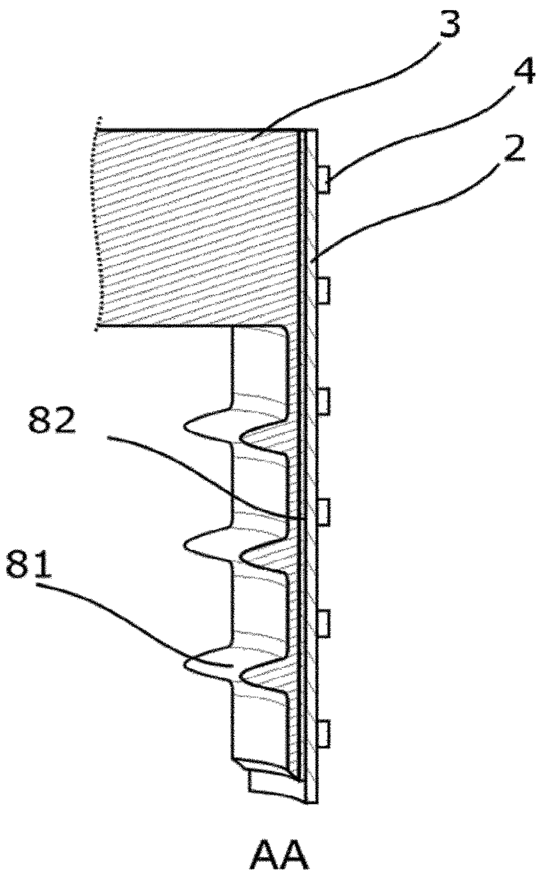
Figure 2B:
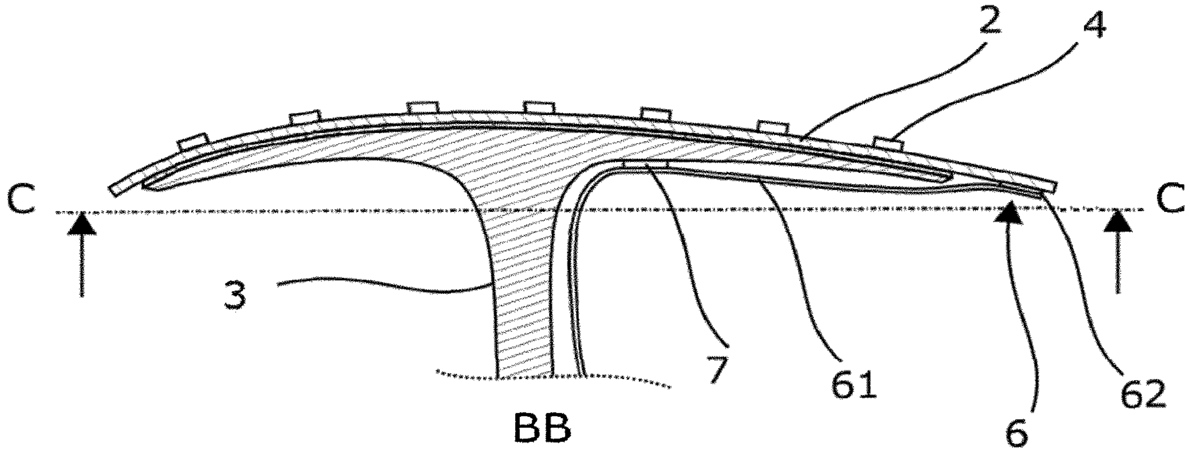
Figure 2C:
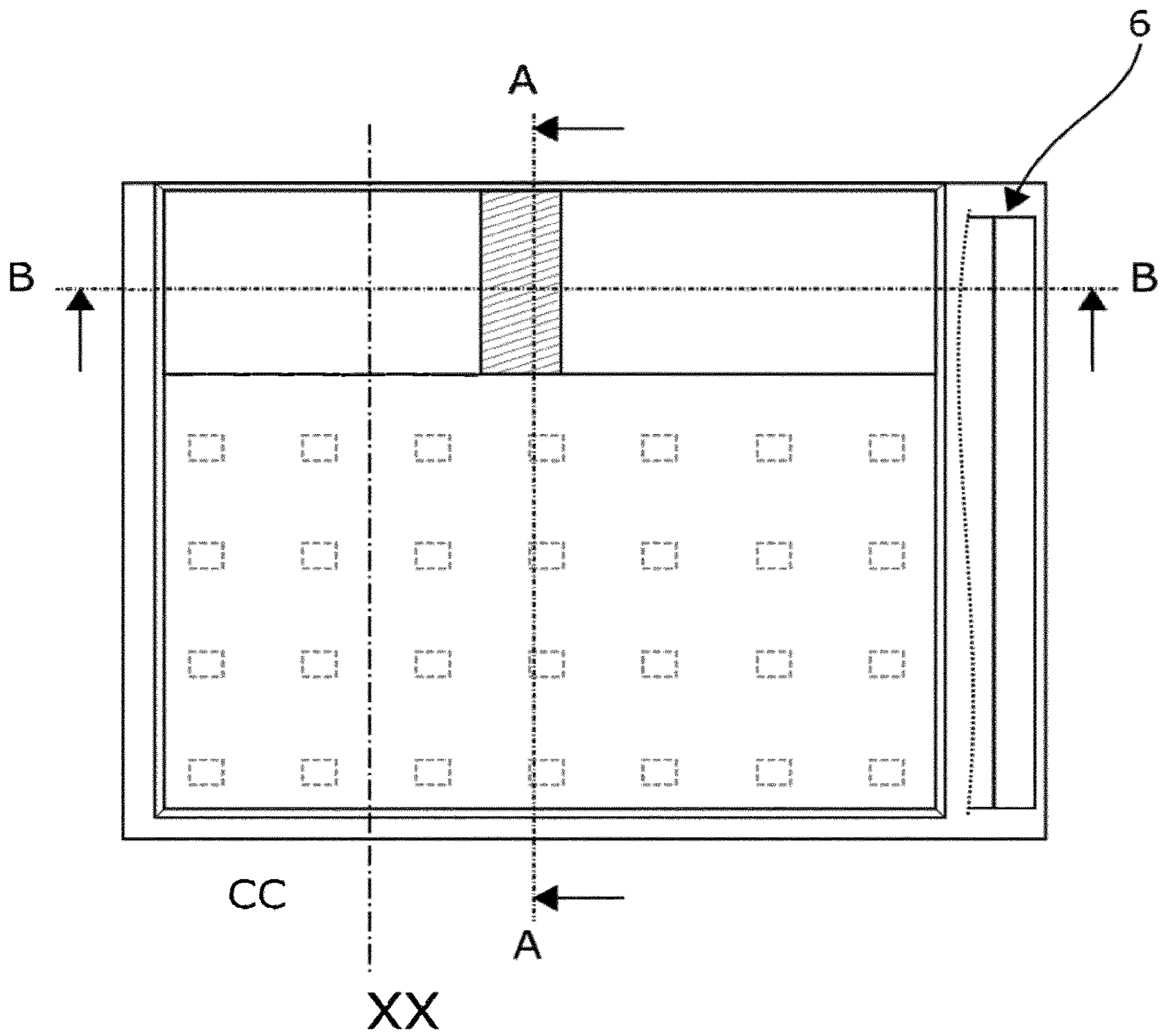
Figure 3A:
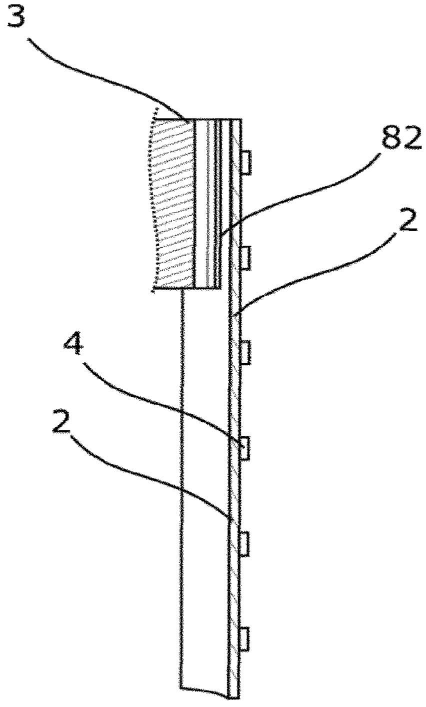
Figure 3B:
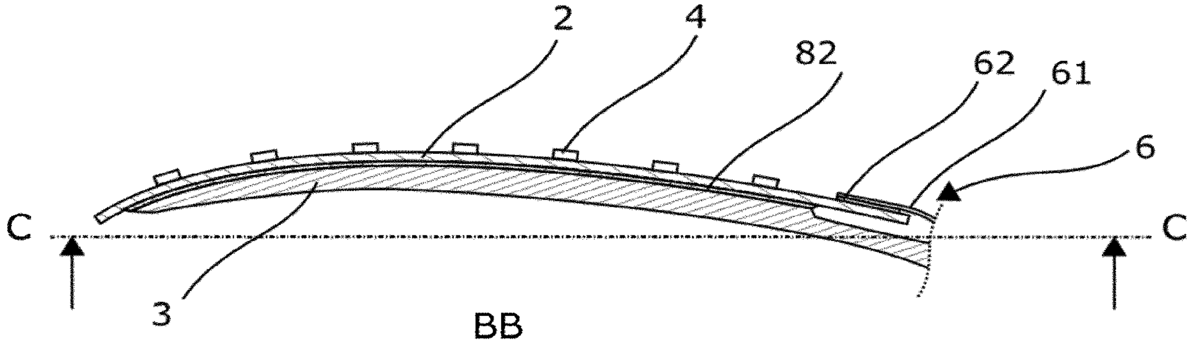
Figure 3C:
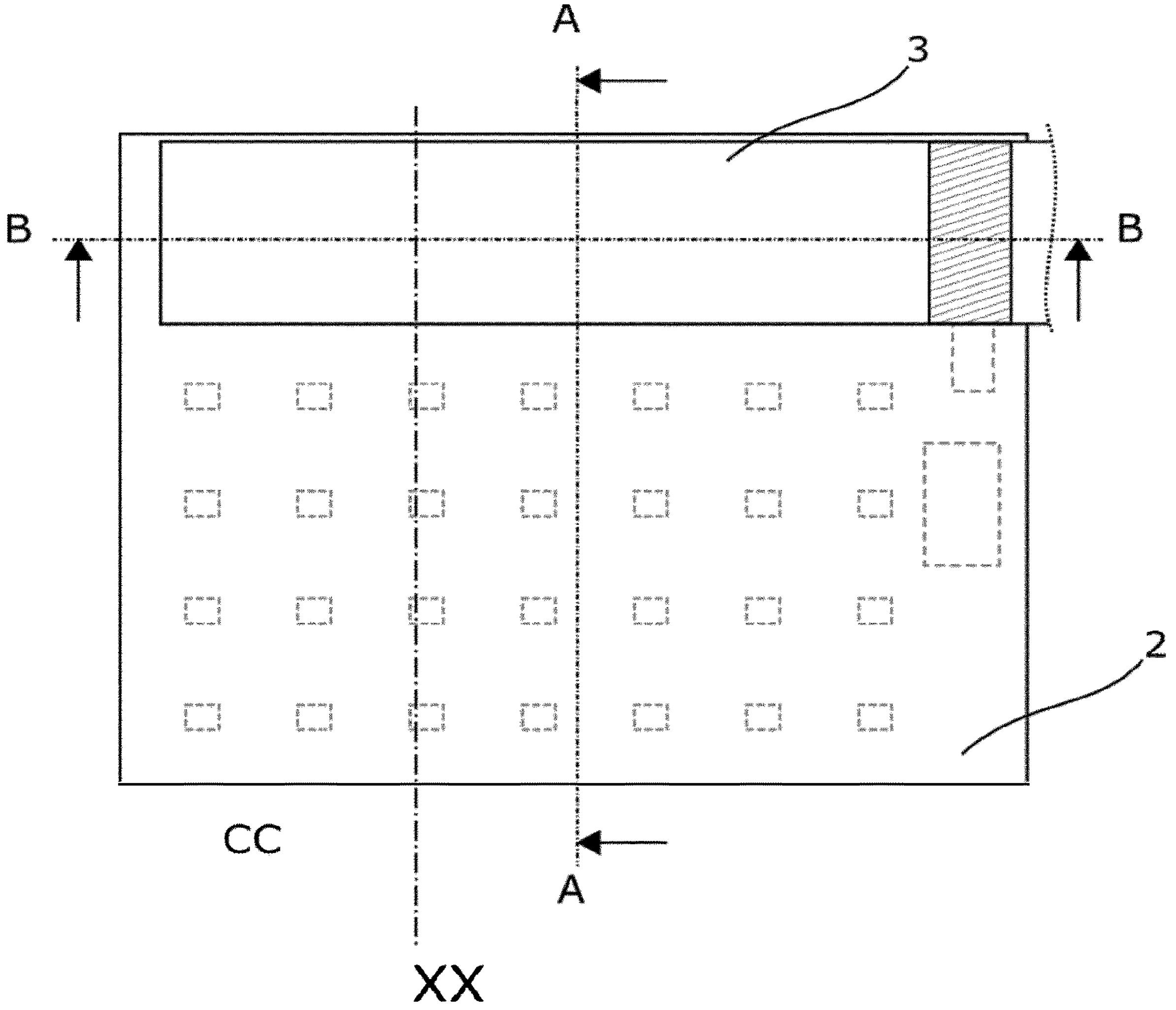
Figure 3D:
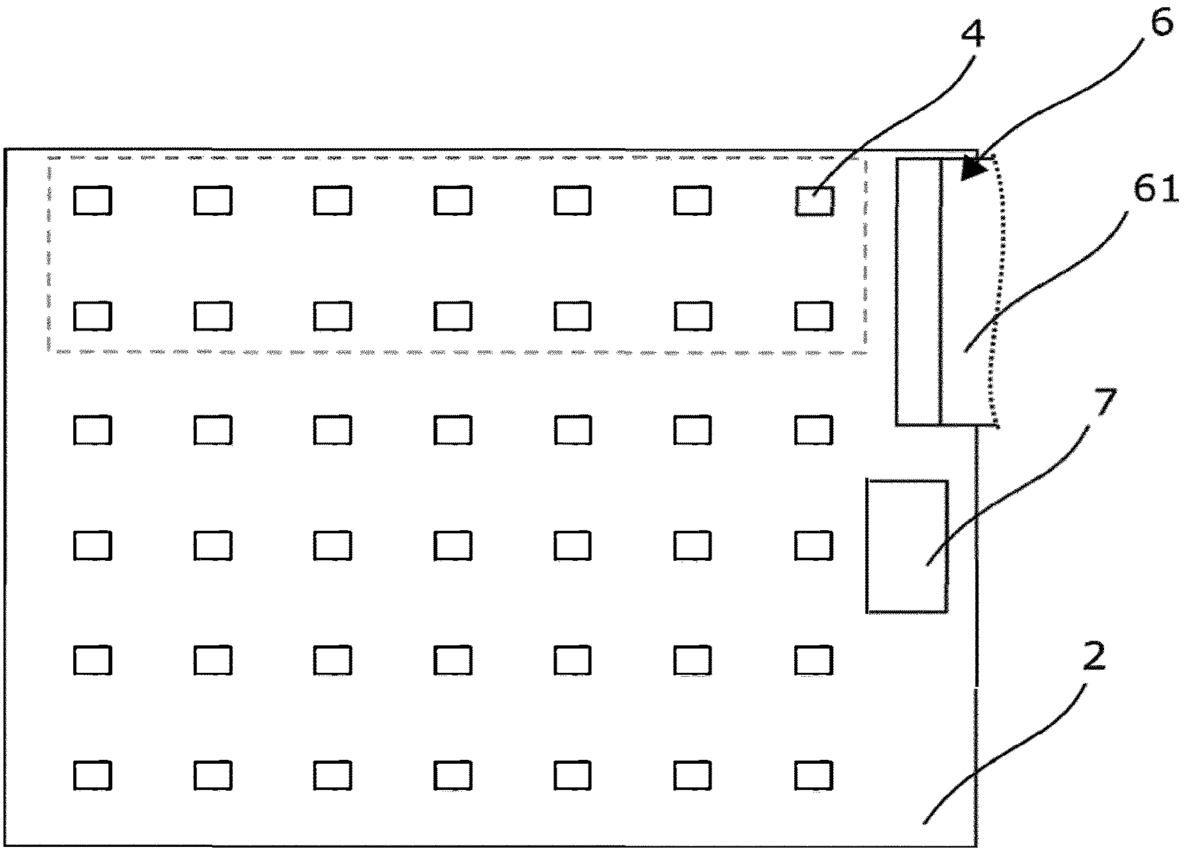

The present invention will now be described by way of examples that are merely illustrative and that in no way limit the scope of the invention, and with reference to the accompanying illustrations, in which:

FIG. 1 schematically and partially depicts a view of a lighting module according to a first embodiment of the invention;

FIG. 2A schematically and partially depicts a view of a lighting module according to a second embodiment of the invention, in section on a plane of section AA;

FIG. 2B schematically and partially depicts a view of the lighting module according to a second embodiment of the invention, in section on a plane of section BB;

FIG. 2C schematically and partially depicts a view of the lighting module according to a second embodiment of the invention, in section on a plane of section CC;

FIG. 3A schematically and partially depicts a view of a lighting module according to a third embodiment of the invention, in section on a plane of section AA;

FIG. 3B schematically and partially depicts a view of the lighting module according to a third embodiment of the invention, in section on a plane of section BB;

FIG. 3C schematically and partially depicts a view of the lighting module according to a third embodiment of the invention, in section on a plane of section CC;

FIG. 3D schematically and partially depicts a view of a lighting module according to a third embodiment of the invention, from an opposite viewpoint to that of FIG. 3C.

In the following description, elements that are identical in terms of structure or in terms of function and that appear in various figures have been designated with the same reference sign, unless otherwise indicated.

FIG. 1 depicts a partial view of a lighting module 1 according to a first embodiment of the invention. The lighting module 1 forms part of a tail light of a motor vehicle. The figure depicts only a substrate 2 having a convex curvature from a viewpoint of an observer external to the vehicle and comprising an electronic circuit, not depicted, a matrix array of light sources 4 arranged on the electronic circuit of the substrate, and a connector 6 placed on the electronic circuit. The footprint of the connector 6 on the substrate 2 has a rectangular overall shape with a long side and a short side.

The substrate has a radius of curvature that evolves about parallel axes. In this case, the axis of curvature is an axis XX to which the axes of curvature of part of the substrate are parallel. The long side is oriented along the axis of curvature XX of the substrate.

FIG. 2A, FIG. 2B, and FIG. 2C depict a partial view of a lighting module 1 according to a second embodiment of the invention. The lighting module 1 forms part of a tail light of a motor vehicle and comprises a substrate 2. Said substrate 2 is a flexible glass substrate, and has a convex curvature from a viewpoint of an observer external to the vehicle.

The substrate 2 comprises an electronic circuit, not depicted. A matrix array of light sources 4 is placed on the substrate and the light sources 4 are mounted on the electronic circuit.

The substrate 2 has an exterior face facing toward the exterior of the vehicle and an interior face facing toward the interior of the vehicle. A connector 6 placed on the interior face is mounted on the electronic circuit of the substrate. The connector comprises a flexible printed circuit board 61 and an anisotropic conductive adhesive 62 designed to mechanically and electrically connect the printed circuit board 61 to the electronic circuit of the substrate. The footprint of the connector 6 on the substrate 2 has a rectangular overall shape with a long side and a short side. The long side is oriented along an axis of curvature XX of the substrate.

The module 1 also comprises a glass substrate 3. The substrate 3 is flexible. The substrate is held in position in the signaling device by a support 3 which also holds the substrate in a convex shape. The means for fixing the substrate to the support have not been depicted.

The module 1 also comprises a control unit 7 designed to power and control the light sources 4. Said control unit 7 is mechanically and electrically mounted on the flexible circuit board 61. Moreover, the control unit comprises several faces and is also fixed by that one of its faces on which the control unit is not mounted. In that way, the control unit is concealed from an observer external to the vehicle when it is in use.

The module 1 comprises a support 3 fitted with an aluminum heat sink member comprising cooling fins 81. A malleable thermal conductor 82 ensures thermal contact between the substrate 2 and the heat sink member of the support 3. The substrate 2 is bonded on the support 3 which holds it in position in the signaling device as well as maintaining its curvature. In that way, the support 3 lends its rigidity to the substrate 2.

The support 3 is produced in such a way that it is not visible to an external observer situated at least at the height of the signaling device when the vehicle is in use. Non-depicted elements of the signaling device conceal the support from any customary viewpoint of an external observer.

FIG. 3A, FIG. 3B, FIG. 3C and FIG. 3D depict various sections of a partial view of a lighting module 1 according to a third embodiment of the invention. The lighting module 1 forms part of a tail light of a motor vehicle and comprises a substrate 2. Said substrate 2 is a rigid metal substrate, and has a convex curvature from a viewpoint of an observer external to the vehicle.

The substrate 2 comprises an electronic circuit, not depicted. A matrix array of light sources 4 is placed on the substrate. The light sources 4 are mounted on the electronic circuit of the substrate 2.

The substrate 2 is held in position in the signaling device by a support 3. The means for fixing the substrate to the support have not been depicted.

The substrate 2 has an exterior face facing toward the exterior of the vehicle and an interior face facing toward the interior of the vehicle. A control unit 7 and a connector 6 are situated on the exterior face of the substrate. The connector comprises a printed circuit board 61 and an anisotropic conductive adhesive 62 designed to mechanically and electrically connect the printed circuit board 61 to the electronic circuit of the substrate. The footprint of the connector 6 on the substrate 2 has a rectangular overall shape with a side and a short side. The long side is oriented along an axis of curvature XX of the substrate.

The support 3 is produced in such a way that the substrate and elements of the signaling device or of the vehicle conceal the support from any customary viewpoint of an external observer, and it is therefore not visible to this observer.

The above description clearly explains how the invention makes it possible to achieve the stated objectives, in particular by proposing a lighting module that is curved, and notably has floating edges.

In any event, the invention should not be regarded as being limited to the embodiments specifically described in this document, and extends, in particular, to any equivalent means and to any technically operative combination of these means.

The invention claimed is:

1. A lighting module for a motor-vehicle signaling device, comprising:

a substrate comprising an electronic circuit, a matrix array of elementary light sources arranged uniformly with a spacing interval of less than 1 mm, the light sources being mounted on the electronic circuit of the substrate, a connector able to receive an instruction for controlling said elementary light sources, a part of said connector being fixed to the substrate, that part of said connector that is fixed to the substrate having a footprint of rectangular overall shape with a long side and a narrow side, and a support designed to hold the substrate in position in the signaling device, wherein said substrate is curved about an axis of curvature, so that the light sources are positioned so as to create a convex display from the viewpoint of an observer external to the vehicle, and so that the long side of the footprint of the connector is substantially parallel to the axis of curvature, and wherein the connector comprises a flexible printed circuit board.

2. The lighting module as claimed in claim 1, wherein the support is configured to hold the substrate in a convex shape.

3. The lighting module as claimed in claim 1, wherein the substrate has an interior face oriented toward the interior of the vehicle, the module being configured so that said interior face of the substrate is held against the support.

4. The lighting module as claimed in claim 3, wherein a control unit is held on the support.

5. The lighting module as claimed in claim 3, wherein the support is designed to be concealed from any viewpoint of an observer external to the vehicle, so long as said viewpoint is situated at a height above ground level that is at least equivalent to that of the device.

6. The lighting module as claimed in claim 1, wherein the support comprises a heat sink member in thermal contact with the substrate.

7. The lighting module as claimed in claim 1, wherein the arrangement of light sources is uniform and covers more than 90% of one face of the substrate, which face faces toward the exterior.

8. The lighting module as claimed in claim 1, wherein the substrate has an exterior face facing toward the exterior of the vehicle, the connector and/or a control unit being mounted on a zone of the exterior face of the substrate that is concealed from a viewpoint of an observer external to the vehicle, said viewpoint being situated at a height that is at least equivalent to that of the device with respect to ground level.

9. The lighting module as claimed in claim 1, wherein the substrate has floating edges without any means of electrical connection and/or of mechanical retention that is visible from a viewpoint of an observer external to the vehicle, and just one edge comprising mechanical-retention and/or electrical-connection means.

10. A lighting module for a motor-vehicle signaling device, comprising:

a substrate comprising an electronic circuit, a matrix array of elementary light sources arranged uniformly with a spacing interval of less than 1 mm, the light sources being mounted on the electronic circuit of the substrate, a connector able to receive an instruction for controlling said elementary light sources, a part of said connector being fixed to the substrate, that part of said connector that is fixed to the substrate having a footprint of rectangular overall shape with a long side and a narrow side, and a support designed to hold the substrate in position in the signaling device, wherein said substrate is curved about an axis of curvature, so that the light sources are positioned so as to create a convex display from the viewpoint of an observer external to the vehicle, and so that the long side of the footprint of the connector is substantially parallel to the axis of curvature, and wherein the substrate has passing through it holes making it possible to establish an electrical connection and in that the connector is located on a face of the substrate that does not have elementary light sources.

11. A lighting module for a motor-vehicle signaling device, comprising:

a substrate comprising an electronic circuit, a matrix array of elementary light sources arranged uniformly with a spacing interval of less than 1 mm, the light sources being mounted on the electronic circuit of the substrate, a connector able to receive an instruction for controlling said elementary light sources, a part of said connector being fixed to the substrate, that part of said connector that is fixed to the substrate having a footprint of rectangular overall shape with a long side and a narrow side, and a support designed to hold the substrate in position in the signaling device, wherein said substrate is curved about an axis of curvature, so that the light sources are positioned so as to create a convex display from the viewpoint of an observer external to the vehicle, and so that the long side of the footprint of the connector is substantially parallel to the axis of curvature, and wherein the connector comprises an anisotropic conductive adhesive.

12. The lighting module as claimed in claim 11, wherein the connector comprises a flexible printed circuit board.

13. The lighting module as claimed in claim 11, wherein the module comprises a control unit designed to power and control the light sources, said control unit being mechanically and electrically mounted on the flexible circuit board.

14. The lighting module as claimed in claim 13, wherein the control unit is held on the support.

15. The lighting module as claimed in claim 11, wherein the substrate has an interior face oriented toward the interior of the vehicle, the module being configured so that said interior face of the substrate is held against the support.

16. The lighting module as claimed in claim 11, wherein the support comprises a heat sink member in thermal contact with the substrate.

17. The lighting module as claimed in claim 11, wherein the connector comprises a flexible printed circuit board.

18. The lighting module as claimed in claim 11, wherein the support is designed to be concealed from any viewpoint of an observer external to the vehicle, so long as said viewpoint is situated at a height above ground level that is at least equivalent to that of the device.

19. The lighting module as claimed in claim 10, wherein the substrate has only floating edges, without any means of electrical connection and/or of mechanical retention that is visible from a viewpoint of an observer external to the vehicle.

20. The lighting module as claimed in claim 10, wherein the connector comprises an anisotropic conductive adhesive.

* * * * *